United States Patent [19]

Takeuchi et al.

[11] Patent Number: 5,043,310

[45] Date of Patent: Aug. 27, 1991

[54] MOLDABLE COMPOSITIONS OF ACTIVATED CARBON AND MOLDED ARTICLES PRODUCED THEREFROM

[75] Inventors: Tatsuro Takeuchi, Moriyama; Masaaki Kameno, Kakogawa, both of Japan

[73] Assignee: Takeda Chemical Industries, Ltd., Osaka, Japan

[21] Appl. No.: 467,411

[22] Filed: Jan. 19, 1990

[30] Foreign Application Priority Data

Jan. 19, 1989 [JP] Japan .................................. 1-11458

[51] Int. Cl.$^5$ .............................................. C01B 31/08
[52] U.S. Cl. ..................... 502/404; 502/416; 502/417; 502/418
[58] Field of Search ................. 502/404, 416, 417, 418

[56] References Cited

U.S. PATENT DOCUMENTS 4,242,226 12/1980 Siren ........................ 502/404
4,818,293 4/1989 Fillipo ...................... 502/417

Primary Examiner—Patrick P. Garvin
Assistant Examiner—Brent M. Peebles
Attorney, Agent, or Firm—Wegner, Cantor, Mueller & Player

[57] ABSTRACT

A moldable composition is disclosed which comprises activated carbon and a polysaccharide of natural origin in an amount of 0.1–10 parts by weight in relation to 100 parts by weight of the activated carbon.

There is further disclosed a process of producing molded articles of activated carbon using the composition.

26 Claims, No Drawings

MOLDABLE COMPOSITIONS OF ACTIVATED CARBON AND MOLDED ARTICLES PRODUCED THEREFROM

This invention relates to a moldable composition of activated carbon and molded articles produced therefrom.

Activated carbon has per se no plasticity, and its mixture with water can not be molded, contrary to a plastic clay-water mixture. Therefore, a method has been known in which activated carbon is mixed with natural plastic clay as a plasticizer making use of the plasticity of the clay together with organic binders such as polyvinyl alcohol, to provide plasiticity or lubricity with the activated carbon.

For instance, there is disclosed in Japanese Patent Laid-open No. 57-95816 and No. 57-95817, a method in which a mixture of activated carbon, clay and an organic binder is kneaded, molded, dried, and then baked under a non-oxidative atmosphere, to provide a molded sintered body.

However, the resultant molded body contains a large amount of clay, and hence has a much reduced adsorption power compared with activated carbon. Furthermore, the fine particles of clay or organic materials added are apt to clog the micropores of activated carbon to further reduce the adsorption power of activated carbon which it originally possesses.

Meanwhile, a further method is also known, as is disclosed in Japanese Patent Laid-open No. 58-84180, to produce a molded article which contains activated carbon using thermosetting resins such as phenolic resins as a precursor of activated carbon. According to the method, a thermosetting resin is kneaded together with an organic binder and water, and the resulting aqueous mixture is molded, for example, to a green honeycomb structure, and the green mold is dried, heated and cured. Then, the resin is first carbonized by heating under a nonoxidative atmosphere, and then heated under an oxidative atmosphere to activate the carbon therein, to provide a honeycomb structure containing activated carbon.

The method has disadvantages in that it contains a number of steps and temperature control in the heating steps is complicated. Further, the resultant molded article contains only a small amount of activated carbon and has a small specific surface area.

The present inventors have made intensive investigations to solve such difficulties as above described involved in the prior arts in plasiticization and molding of activated carbon, and found that the addition of small amounts of a certain group of polysaccharides to activated carbon together with water makes the activated carbon plastic or moldable, and that the molding and drying of the aqueous plastic composition readily provides molded articles having a large specific surface area and a high mechanical strength and dimensional accuracy.

It is, therefore, an object of the invention to provide an aqueous moldable composition of activated carbon which per se has no plasticity.

It is also an object of the invention to provide a process of producing molded articles of activated carbon.

It is a further object of the invention to provide a molded article of activated carbon.

In accordance with the invention, there is provided a moldable composition which comprises activated carbon and a polysaccharide of natural origin in an amount of 1-10 parts by weight in relation to 100 parts by weight of the activated carbon.

According to the invention, there is further provided a process of producing molded artcles of activated carbon which comprises preparing a composition comprising activated carbon and a polysaccharide of natural origin in an amount of 1-10 parts by weight in relation to 100 parts by weight of the activated carbon, and molding and drying the composition.

The activated carbon used in the invention includes, for example, coconut shell activated carbon, steam activated carbon, coal base activated carbon, zinc chloride activated carbon and the like. The activated carbon is used in the form of powder, and may be used singly or as mixtures of two or more activated carbons. It is desired that the powder of activated carbon used has a particle size as small as possible, and usally it is desired that the powder of activated carbon has a particle size of not more than 5 $\mu$m.

The polysaccharide used in the invention are of natural origin, and include those of microbial, plant and animal origin.

The term, polysaccharides of natural origin, herein the specification should be understood in the most normal sense, and such polysaccharides of natural origin herein include from oligosaccharides of polymerization degree of about 10 to polysaccharides of molecular weight of more than about 10,000. Almost all the polysaccharides of natural origin usually available have molecular weight of more than about 10,000.

Thus, semi-synthesized polysaccharides which are obtained by chemical treatment, such as esterification, of polysaccharides of natural origin, is not a polysaccharide of natural origin in the specification. In this sense, carboxymethyl cellulose is not included in the polysaccharides of natural origin in the specification. However, chemical means or treatments inevitably utilized to obtain polysaccharides of natural origin are not included in the chemical treatment as defined above, and therefore, for example, neither treatments of culture broth with an alkali and neutralization to obtain polysaccharides of microbial origin, nor extraction treatments to obtain various polysaccharides of plant origin are included in the treatments to obtain semi-synthesized polysaccharides. Therefore, for example, treatments of culture broth with an alkali or neutralization to obtain curdlan are not included in the treatments to obtain semi-synthesized polysaccharides.

On the other hand, for example, esterification or ammonium salt formation of polysaccharides of natural origin are chemical treatments to obtain semi-synthesized polysaccharides when the polysaccharide of natural origin as it is has no ester or ammonium salt structures. However, natural pectic acid as it is has methyl ester structures therein, and thus natural pectic acid is a polysaccharide of natural origin in the specification.

Therefore, there may be mentioned as polysaccharides of microbial origin used in the invention, for example, dextran, gellan gum, xanthan gum, curdlan, pramylon and pullulan.

There may be mentioned as polysaccharides of plant origin, for example, extraction polysaccharides such as pection or arabinogalactan; seed polysaccharides such as guar, locust bean gum, tara gum or tamarind seed gum; exudate polysaccharides such as gum tragacanth, gum arabic or gum ghatti; red seaweed (rhodophyceae) polysaccharides such as carageenan; brown seaweed (phaeophyceae) polysaccharides such as alginic acid; structural polysaccharides such as xylan or laminarin; reserve polysaccharides such as konjak mannan. Further, polysaccharides of animal origin used in the invention may be exemplified by, for example, structural polysaccharides such as chitosan, and mucopolysaccharides such as hyaluronic acid or chondroitin sulfate.

The above mentioned polysaccharides of natural origin are known to be water-retentive. It is likely that the water-retentive properties of the polysaccharides used is one of requisites for providing activated carbon which itself is substantially non plastic with plasticity.

From the standpoint of chemical structures, glucans are preferred, and $\beta$-1,3-glucans which are mainly composed of $\beta$-1,3-glucoside linkages are most preferred such as curdlan, laminarin, paramylon, callose, pachyman or scleroglucan, among a number of polysaccharides as set out before. Pullulan is a glucan which is mainly composed of $\alpha$-1,4- and $\alpha$-1,6-glucoside linkages, however, it is also preferred in the invention.

Meanwhile, from the standpoint of the origin of the polysaccharides, curdlan, paramylon, pullulan, dextran or the like are preferred among the microbial polysaccharides. In turn, among the polysaccharides of plant origin are preferred seed polysaccharides such as guar or locust bean gum, structural polysaccharides such as xylan or laminarin, and reserve polysaccharides such as konjak mannan. The use of small amounts of these polysaccharides makes nonplastic activated carbon plastic or moldable.

Most preferred polysaccharides used in the invention are glucans of microbial origin, especially $\beta$-1,3-glucans of microbial orgin, such as curdlan or paramylon, since these glucans provide nonplasticic activated carbon with a higher plasticity or moldability, and dried molded bodies produced therefrom have in particular a higher mechanical strength and dimensional accuracy. In this regard, curdlan is most preferred, Curdlan is a polysaccharide which contains mainly $\beta$-1,3-glucoside linkages, and which is usually curdled or coagulated when heated in the presence of water, i.e., which property being herein referred to as "thermocurdling", or forms a gel when heated in the presence of water, as described, for example, in New Food Industry, Vol. 20, No. 10, pp. 49–57 (1978).

Curdlan may be produced by Alkaligenes or Agrobacterium microorganisms, more specifically, by *Alkaligenes faecalis var myxogenes* 10C3K (Agricultural Biological Chemistry, Vol. 30, p. 196 (1966)), a mutant NTK-$\mu$ (IFO 13140) of the above (Japanese Patent Publication no 48-32673), *Agrobacterium radiobacter* (IFO 13127) or its mutant (IFO 12126) (Japanese Patent Publication no 48-32674).

Curdlan is a microbial polysaccharide as above, and it may be used as inpurified state or highly purified, with the same with the other polysaccharides.

Paramylon is also one of natural orgin $\beta$-1,3-glucans, as described hereinbefore. From the standpoint of origin, it is a reserve polysaccharide which a microbe Euglena reserves in cells, and is already known as described in Carbohydrate Research, 25, 231–242 (1979) or Japanese Patent Laid-open No. 1-37297. However, paramylon is not thermocurdling, contrary to curdlan. Thus, paramylon may be treated with an alkali so that it is thermocurdling, if desired. The thus alkali treated paramylon is regarded as a natural origin polysaccharide in the invention. Paramylon may be used as inpurified state or highly purified.

The aqueous moldable composition of activated carbon of the invention contains, as a first molding assistant, at least one polysaccharide of natural origin as set out above, usually in an amount of about 0.1–10 parts by weight, preferably in an amount of about 0.5–5 parts by weight, in relation to 100 parts by weight of the activated carbon used.

In accordance with the invention, the use of the polysaccharide of natural origin as set out before is essential to provide nonplastic activated carbon with plasticity. However, the co-use of the polysaccharide of natural origin as a first molding assistant and in addition a second molding assistant is sedired so that the resultant composition has a higher moldability and produces molded bodies of a higher mechanical strength. The second molding assistants are those usually known in the production of molded articles in general, and may be used depending upon the activated carbon used or requisites to the resultant molded bodies.

Therefore, the second molding assistants include, for example, cellulosic compounds, polyhydric compounds and polyvinyl compounds.

More specifically, the cellulosic compound includes methyl cellulose, ethyl cellulose, carboxymethyl cellulose, sodium carboxymethyl cellulose, hydroxyethyl cellulose and hydroxypropyl cellulose. The polyhydric compound used includes, for example, glycerine; alkylene glycols such as ethylene glycol, propylene glycol or 1,3-butylene glycol; and polyalkylene glycols such as polyethylene glycol or polypropylene glycol. A variety of polyvinyl compounds may be useful as assistants, and there may be used, for instance, polyvinyl alcohol, polyvinyl pyrrolidone, polyacrylic acid resins, polyacrylic acid salt resins, e.g., polyammnoum acrylate, acrylic acid-maleic acid copolymers, or their ammonium salts. The polyacrylic acid resin may be cross-linked.

A variety of compounds are usable as second molding assistants in addition to the above, and for example, carboxymethyl starch, sodium alginate or ammonium alginate may be mentioned.

The second molding asistant may be used singly or as a mixture of two or more, and may be contained in an amount usually of about 1–50 parts by weight, preferably in an amounts of about 5–30 parts by weight, in relation to 100 parts by weight of activated carbon used.

Among a large number of second molding assistants, methyl cellulose is especially preferred. More specifically the co-use of thermocurdling polysaccharides such as curdlan, pachyman or alkali treated paramylon as the first molding assistant and methyl cellulose as the second molding assistant provides compositions of activated carbon of very high moldability. As hereinafter described in more detail, such a composition provides molds of activated carbon of high mechanical strength without cracking when the composition is first heated to curdle the thermocurdling polysaccharide contained in the composition and then dried.

The moldable composition of the invention may further contain a wetting agent or surfactant such as polyethylene glycol alkylethers, or a lubricant such as zinc stearate, aluminum stearare or magnesium stearate.

The method of producing moldable composition of activated carbon of the invention is not specifically limited. By way of example, one or more of the polysaccharides as before mentioned and, if desired, with a second molding assistant, both as powders, or as a solution or dispersion in water or a water soluble organic solvent such as methanol or ethanol, are added to activated carbon, and then fully mixed together. Then, an appropriate amount of water is added to the mixture and kneaded, to provide an aqueous moldable composition of the invention. A polysaccharide and a second molding assistant may be added separately to activated carbon.

A dried mold of the invention is obtained by molding the aqueous composition as above set forth to a green mold, by, for example, extrusion molding, and the drying the green mold usually at temperature ranging from room temperature to about 110° C. If desired, the dried mold may be sintered at temperature of about 600°–1400° C. under a nonoxidative atmosphere.

The dried mold may be of any shape, and for example, it may be grains, rods, pipes, plates or honeycombs.

As previously mentioned, it is preferred that green molds of aqueous composition of activated carbon are heated in the presence of water to curdle or coagulate the thermocurdling polysaccharide contained therein prior to drying the molds. In general, the curdling of the thermocurdling polysaccharide may be carried out by heating the green molds while preventing the spontaneous evaporation of water contained in the molds, if necessary in the presence of additional water. More specifically, the green molds may be heated in a closed vessel or under a saturated steam. Alternatively, the green mold may be heated with microwave.

The green molds are heated in such manners at temperatures usually of about 70°–150° C., although depending upon the individual thermocurdling polysaccharide used, over a sufficient period of time, usually for 0.5–6 hours.

In this way, when the polysaccharide is first curdled and then the green mold is dried, the green mold is strengthened and no crack is produced during being dried. After the curdling the polysaccharide, the green mold may be dried in usual manners. For example, the mold may be placed under high temperature, dried with hot air or dried at low temperature.

The invention will now be described with reference to examples, however, the examples are illustrative only, and the invention is not limited thereto.

REFERENCE (Production and Purification of Curdlan)

In accordance with the method described in Japanese Patent Publication No. 48-32673, a culture broth was treated with an alkali, centrifuged, neutralized with an acid, to provide a solution of curdlan. The solution was desalted and concentrated to provide curdlan.

EXAMPLE 1

An amount of 200 g of powder of granular activated carbon (FPG-1 by Takeda Chemical Industries, Ltd., BET specific surface area of 1550 $m^2/g$, average particle size of 5 μm) was fully admixed with 8 g of curdlan and 24 g of a mixture as a second molding assistant of methyl cellulose (a 2% by weight aqueous solution of which had a viscosity of 400 centipoises at 20° C.), polyethylenbe glycol of average molecular weight of about 6000 and sodium alginate in an equal weight ratio in a polyethylene envelope.

The mixture was kneaded with 292 g of distilled water with a twin screw kneader provided with a jacket thereroud for 30 minutes while cold water at temperature of 10° C. was fed to the jacket to cool the kneaded mixture.

The resultant composition of activated carbon was charged in a flow tester (Model CFT-500, K. K. Shimadzu Seisakusho) provided with a nozzle of 1 mm in diameter, and extruded with a pressure of 30 $kg/cm^2$ into cords of 1 mm in diameter. The cords were dried at 40° C. for 12 hours and then at 115° C. overnight, to provide dried molds in the form of cord.

The cords were cut to a length of about 5 mm and their acetone adsorption powers and BET specific surface areas were measured. Air which contained therein acetone vapor in an amount of 3715 g per cubic meter was passed through an amount of about 5 g of the cords at a rate of 2 liters per minute at 25° C. After one hour, the cords reached a constant weight, and the acetone adsorption power was calculated from weight increase of the cords. The BET specific surface area was measured with a specific surface area measuring apparatus (Model ASAP-2400 by Mimeritics) by a nitrogen adsorption method.

The results are shown in the Table 1.

EXAMPLE 2

Using a mixture of 200 g of the same podered activated carbon, 12 g of the same molding assistant as in the Example 1 and 304 g of distilled water, a dried mold was prepared in the same manner as in the Example 1.

The acetone adsorption power and BET specific surface area are shown in the Table 1.

EXAMPLE 3

Using a mixture of 180 g of the same podered activated carbon, 20 g of New Zealand kaolin, 4 g of curdlan, 4 g of methyl cellulose (a 2% by weight aqueous solution of which had a viscosity of 400 centipoises at 20° C.), 4 g of polyethylene glycol of average molecular weight of about 6000 and 260 g of distilled water, a dried mold was prepared in the same manner as in the Example 1.

The acetone adsorption power and BET specific surface area are shown in the Table 1.

COMPARATIVE EXAMPLE 1

Using a mixture of 140 g of the same podered activated carbon, 60 g of natural clay (Iga-Kibushi clay), 10 g of polypropylene glycol of average molecular weight of about 3000, 30 g of methyl cellulose (a 2% by weight aqueous solution of which had a viscosity of 4000 centipoises at 20° C.) and 260 g of distilled water, a dried mold was prepared in the same manner as in the Example 1.

The resultant dried mold was further calcined at 950° C. for three hours.

The acetone adsorption power and BET specific surface area of the dried and sintered molds are shown in the Table 1, together with those of the activated carbon itself used for comparison.

The dried or sintered mold prepared in a conventional manner is found to have a much smaller BET specific surface than the activated carbon used, and the acetone adsorption power is noticeably reduced compared with the activated carbon used. On the contrary, the dried mold of the invention retains a large BET specific surface area and acetone adsorption power compared with the activated carbon used.

TABLE 1

| | BET Specific Surface Area (m$^2$/g) | Acetone Adsorption Power (%) |
|---|---|---|
| Example 1 | 1166 | 34.7 |
| Example 2 | 1355 | 31.7 |
| Example 3 | 1112 | 29.4 |
| Comparative 1 | | |
| Dried mold | 670 | Not Determined |
| Sintered mold | 913 | 20.5 |
| Activated carbon | 1550 | 38.0 |

EXAMPLE 4

An amount of 1 kg of the same powdered activated carbon as in the Example 1 was dry mixed with 50 g of curdlan and 100 g of methyl cellulose (a 2% by weight aqueous solution of which had a viscosity of 3000 centipoises at 20° C.) with a kneader for about 30 minutes.

The mixture was then mixed with 1.2 kg of distilled water and kneaded over about one hour with a kneader provided with a jacket therearound while it was vacuum dehydrated (about 100-200 mmHg) and cold water at 10° C. was fed to the jecket. The resultant mixture was further vacuum kneaded with an extruder.

The resultant composition was then extruded with an extruder to a green honeycomb mold having an outer diameter of 30 mm and a cell number of 160 per square inch. The mold was placed in a closed vessel and heated at 115° C. for about 2 hours, to curdle the polysaccharide used, i.e., curdlan. Then, the mold was taken out of the vessel and dried at 115° C. in an oven for 15 hours.

The resultant dried mold was found to have an acetone adsorption power of 28.1%.

EXAMPLE 5

An amount of 1 kg of the same powdered activated carbon as in the Example 1 was dry mixed with 40 g of curdlan, 120 g of methyl cellulose (a 2% by weight aqueous solution of which had a viscosity of 30000 centipoises at 20° C.) and 40 g of ammonium alginate with a kneader for about 30 minutes.

The mixture was then mixed with 1.2 kg of distilled water and vacuum kneaded in the same manner as in the Example 4.

The resultant composition was then extruded with an extruder to a green honeycomb mold having an outer diameter of 30 mm and a cell number of 160 per square inch. The mold was then heated in a closed vessel at 115° C. for about two hours, taken out of the vessel and dried at 115° C. in an oven for 15 hours.

The resultant dried mold was cut to a length of 27 mm and air containing 100 ppm of ozone was passed therethrough at room temperature. After two hours, the air was found to contain 14 ppm of ozone at the outlet of the honeycomb mold, and thus the ozone decomposition rate was found 86%.

EXAMPLE 6

An amount of 2 g of powder of paramylon was dissolved in a 2N aqueous solution of sodium hydroxide under stirring. A 4N aqueous solution of hydrochloric acid was added to the solution to adjust the pH at 6.0 to precipitate β-1,3-glucan. The resultant slurry was centrifuged (8000 rpm, 10 minutes) and concentrated, and 200 ml of water was added to the slurry. The slurry was again centrifuged and concentrated in the same manner as above to provide 50 g of a paste. The paste was frozen at −20° C. Ethanol of a volume twice the paste was added thereto, and then frozen, followed by filtration with a filtering pater under vacuum to provide 8 g of a dehydrated matter. The matter was vacuum dried at 60° C. to provide about 2 g of thermocurdling powder of paramylon.

To 5 g of the same thermocurdling powder of paramylon as above were added 1 kg of the same podered activated carbon as in the Example 1 and 10 g of methyl cellulose (a 2% by weight aqueous solution of which had a viscosity of 30000 centipoises at 20° C.) and dry mixed in a polyethylene envelope.

An amount of 140 g of distilled water was added to the mixture, and kneaded in the same manner as in the Example 1. The thus prepared composition was extruded into cords of 1 mm in diameter with a pressure of 30 kg/cm$^2$ in the same manner as in the Example 1.

In the extrusion of the composition, moldability of the composition was evaluated as follows: "excellent" when a cord of more than one meter in length was obtained continuously; "good" when a cord of about one meter in length was obtained; "no good" when a cord snapped while short. The results are shown in Table 2. The acetone adsorption power and BET specific surface area of the dried mold determined in the same manner as in the Example 1 are also shown in the Table 2.

EXAMPLE 7

An amount of 5 g of pullulan was used in place of paramylon and 130 g of distilled water were used, and otherwise in the same manner as in the Example 6, an aqueous composition was prepared and extruded into cords of 1 mm in diameter.

The moldability of the composition is shown in the Table 2 together with the acetone adsorption power and BET specific surface area of the dried mold.

TABLE 2

| | | Dried Mold | |
|---|---|---|---|
| | Composition Moldability | BET Specific Surface Area (m$^2$/g) | Acetone Adsorption Power (%) |
| Example 6 | Excellent | 1180 | 30.5 |
| Example 7 | Excellent | 1210 | 31.6 |

COMPARATIVE EXAMPLE 2

An amount of 140 g of the same podered activated carbon as in the Example 1 was mixed with 60 g of natural clay (Iga-Kibushi clay), 10 g of polypropylene glycol having an average molecular weight of about 3000 and 30 g of methyl cellulose (a 2% by weight aqueous solution of which had a viscosity of 4000 centipoises at 20° C.) in the same manner as in the Example 1 to provide an aqueous composition of acrtivated carbon.

The composition was extruded into cords of 1 mm in diameter in the same manner as in the Example 1, to find that the moldability was "good".

EXAMPLE 8

An aqueous composition was prepared in the same manner as in the Example 4.

The composition was charged in a flow tester provided with a dual pipe nozzle, extruded with a pressure of 50 kg/cm$^2$ and dried, to provide a mold in the form of pipe of 2 mm in outer diameter and 1 mm in inner diameter.

EXAMPLE 9

An aqueous composition was prepared in the same manner as in the Example 4.

The composition was charged in an extruder provided with dies, extruded and dried, to provide a honeycomb structure having an diameter of 8 mm and a cell number of 160 per square inch.

EXAMPLE 10

An aqueous composition was prepared in the same manner as in the Example 4.

The composition was charged in an extruder provided with slit dies, extruded and dried, to provide a mold in the form of plate of 3 mm in thickness and 50 mm in breadth.

What is claimed is:

1. A plastic and moldable composition which comprises activated carbon and a polysaccharide of natural origin in an amount of 0.1–10 parts by weight in relation to 100 parts by weight of the activated carbon, and water in an amount effective to render the composition kneadable.

2. The composition as claimed in claim 1 wherein the polysaccharide of natural origin is a glucan.

3. The composition as claimed in claim 2 wherein the glucan is a $\beta$-1,3-glucan.

4. The composition as claimed in claim 3 wherein the $\beta$-1,3-glucan is curdlan.

5. The composition as claimed in claim 3 wherein the $\beta$-1,3-glucan is paramylon.

6. The composition as claimed in claim 2 wherein the glucan is pullulan.

7. The composition as claimed in claim 1 which further contains a second mold assistant.

8. The composition as claimed in claim 7 wherein the second molding assistant is methyl cellulose.

9. A process of producing molded articles of activated carbon which comprises preparing a composition comprising activated carbon and a polysaccharide of natural origin in amounts of 0.1–10 parts by weight in relation to 100 parts by weight of the activated carbon, and molding and drying the composition.

10. The process as claimed in claim 9 wherein the polysaccharide of natural origin is a glucan.

11. The process as claimed in claim 9 wherein the glucan is a $\beta$-1,3-glucan.

12. The process as claimed in claim 11 wherein the $\beta$-1,3-glucan is curdlan.

13. The process as claimed in claim 11 wherein the $\beta$-1,3-glucan is paramylon.

14. The process as claimed in claim 10 wherein the glucan is pullulan.

15. The process as claimed in claim 9 wherein the composition further contains a second molding assistant.

16. The process as claimed in claim 15 wherein the second molding assistant is methyl cellulose.

17. The process as claimed in claim 9 wherein the molded article is a honeycomb structure.

18. A molded article of activated carbon produced by preparing a composition comprising activated carbon and a polysaccharide of natural origin in an amount of 0.1–10 parts by weight in relation to 100 parts by weight of the activated carbon, and molding and drying the composition.

19. The molded article as claimed in claim 18 wherein the polysaccharide of natural origin is a glucan.

20. The molded article as claimed in claim 19 wherein the glucan is a $\beta$-1,3-glucan.

21. The molded article as claimed in claim 20 wherein the $\beta$-1,3-glucan is curdlan.

22. The molded article as claimed in claim 20 wherein the $\beta$-1,3-glucan is paramylon.

23. The molded article as claimed in claim 19 wherein the glucan is pullulan.

24. The molded article as claimed in claim 18 wherein the composition further contains a second molding assistant.

25. The molded article as claimed in claim 24 wherein the second molding assistant is methyl cellulose.

26. The molded article as claimed in claim 18 wherein the molded article is a honeycomb structure.

* * * * *